United States Patent [19]

Coates et al.

[11] Patent Number: 5,715,699
[45] Date of Patent: Feb. 10, 1998

[54] REFRIGERATOR WATER FILTER

[75] Inventors: Donald A. Coates, Columbus; Robert C. Russell, Dublin; Kenneth E. Morris, Dublin; Walton E. Sparks, Dublin, all of Ohio; Rickie L. Gunderson, Greenville, Mich.

[73] Assignee: White Consolidated Industries, Inc., Cleveland, Ohio

[21] Appl. No.: 739,256

[22] Filed: Oct. 30, 1996

Related U.S. Application Data

[62] Division of Ser. No. 587,635, Jan. 17, 1996.

[51] Int. Cl.$^6$ ........................................... F25D 23/12
[52] U.S. Cl. ........................... 62/338; 62/340; 62/389; 210/416.3; 210/444
[58] Field of Search ..................... 62/340, 389, 338, 62/339; 210/232, 238, 416.3, 443, 444, 455, 497.01

[56] References Cited

U.S. PATENT DOCUMENTS

| | | |
|---|---|---|
| 2,567,062 | 9/1951 | Edelen . |
| 2,622,738 | 12/1952 | Kovacs . |
| 3,122,501 | 2/1964 | Hultgren . |
| 3,146,606 | 9/1964 | Grimes et al. . |
| 3,367,127 | 2/1968 | Walker ................................ 62/353 |
| 3,982,406 | 9/1976 | Hanson et al. . |
| 4,172,798 | 10/1979 | Kronsbein . |
| 4,529,866 | 7/1985 | Leary . |
| 4,556,484 | 12/1985 | Hunter et al. . |
| 4,561,979 | 12/1985 | Harms et al. . |
| 4,571,953 | 2/1986 | Caruso . |
| 4,580,542 | 4/1986 | Kawabata . |
| 4,764,275 | 8/1988 | Robichaud . |
| 4,808,302 | 2/1989 | Beall, Jr. . |
| 4,815,497 | 3/1989 | Pick . |
| 4,839,037 | 6/1989 | Bertelsen et al. . |
| 4,859,320 | 8/1989 | Beall, Jr. . |
| 4,866,250 | 9/1989 | Pasbrig . |
| 4,915,831 | 4/1990 | Taylor . |
| 5,013,434 | 5/1991 | Furrow . |
| 5,049,269 | 9/1991 | Shah . |
| 5,083,442 | 1/1992 | Vlock . |
| 5,122,272 | 6/1992 | Iana et al. . |
| 5,133,858 | 7/1992 | Walz et al. . |
| 5,135,645 | 8/1992 | Sklenak et al. . |
| 5,171,430 | 12/1992 | Beach et al. . |
| 5,200,067 | 4/1993 | Sann . |
| 5,269,154 | 12/1993 | Schmidt . |
| 5,290,442 | 3/1994 | Clack . |
| 5,336,406 | 8/1994 | Stanford et al. . |
| 5,445,734 | 8/1995 | Chen . |
| 5,454,944 | 10/1995 | Clack . |

*Primary Examiner*—William E. Tapolcai
*Attorney, Agent, or Firm*—Pearne, Gordon, McCoy & Granger LLP

[57] ABSTRACT

A water filter assembly mounted to an inner surface of a refrigerator and accessible from within a refrigeration compartment of the refrigerator. The filter assembly includes a first housing part, a second housing part, and a replaceable filter cartridge. The first and second housing parts cooperate to define a fluid-tight chamber for receipt of the filter cartridge. The first housing part includes an inlet port through which unfiltered water may be introduced into the chamber and an outlet port through which filtered water may exit the chamber. The second housing part surrounds a portion of the first housing part and provides a volume sufficient to hold the filter cartridge and any water within the chamber when the second housing part is released from the first housing part to replace the filter cartridge, and thereby prevents or minimizes spillage of water from the filter assembly during filter cartridge replacement. A shield member is disposed within the refrigeration compartment and cooperates with a cabinet wall to define a filter compartment which surrounds the filter assembly. A heater disposed within the filter compartment adjacent the filter assembly and is operable to heat the filter assembly to prevent freezing of water contained therein.

15 Claims, 6 Drawing Sheets

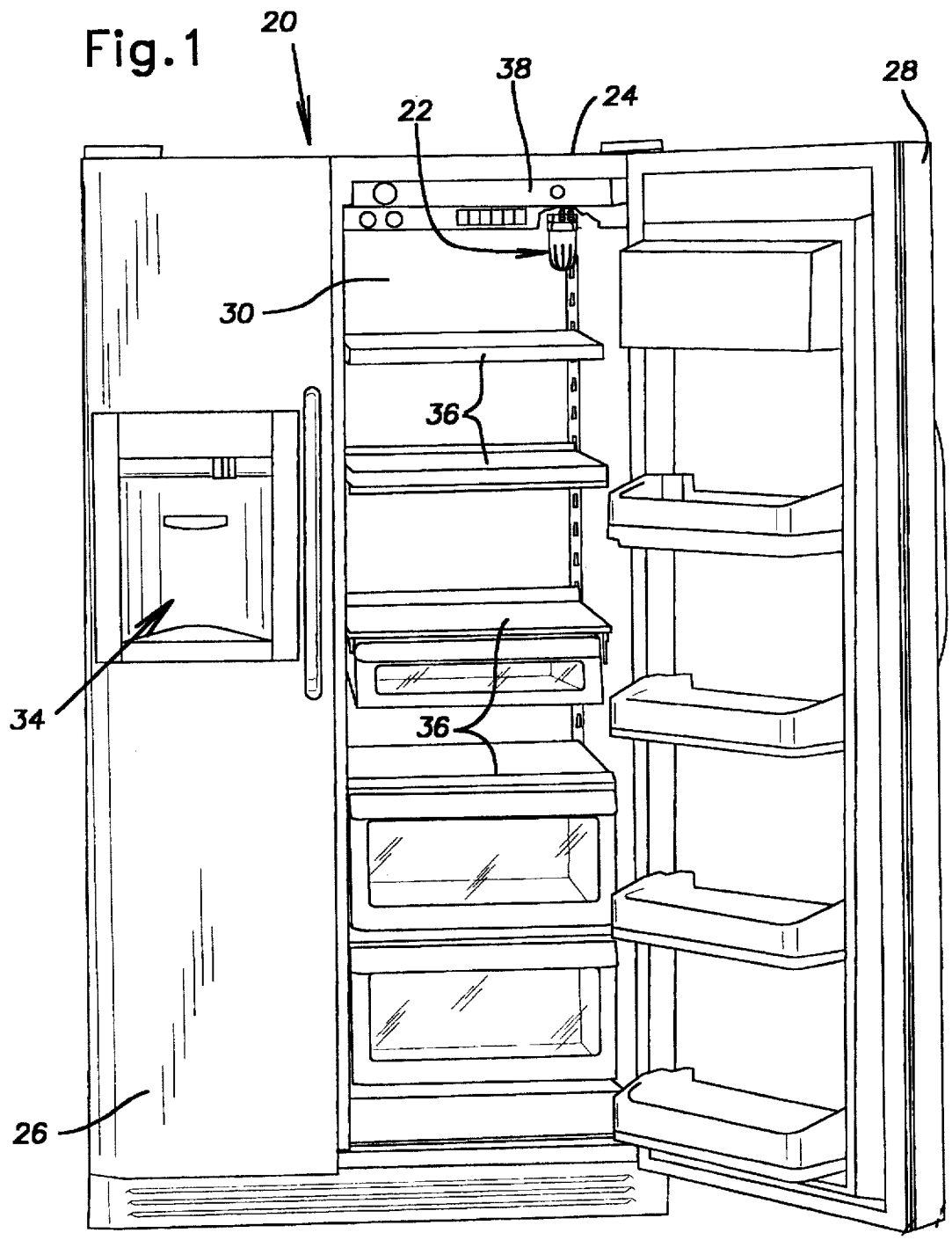

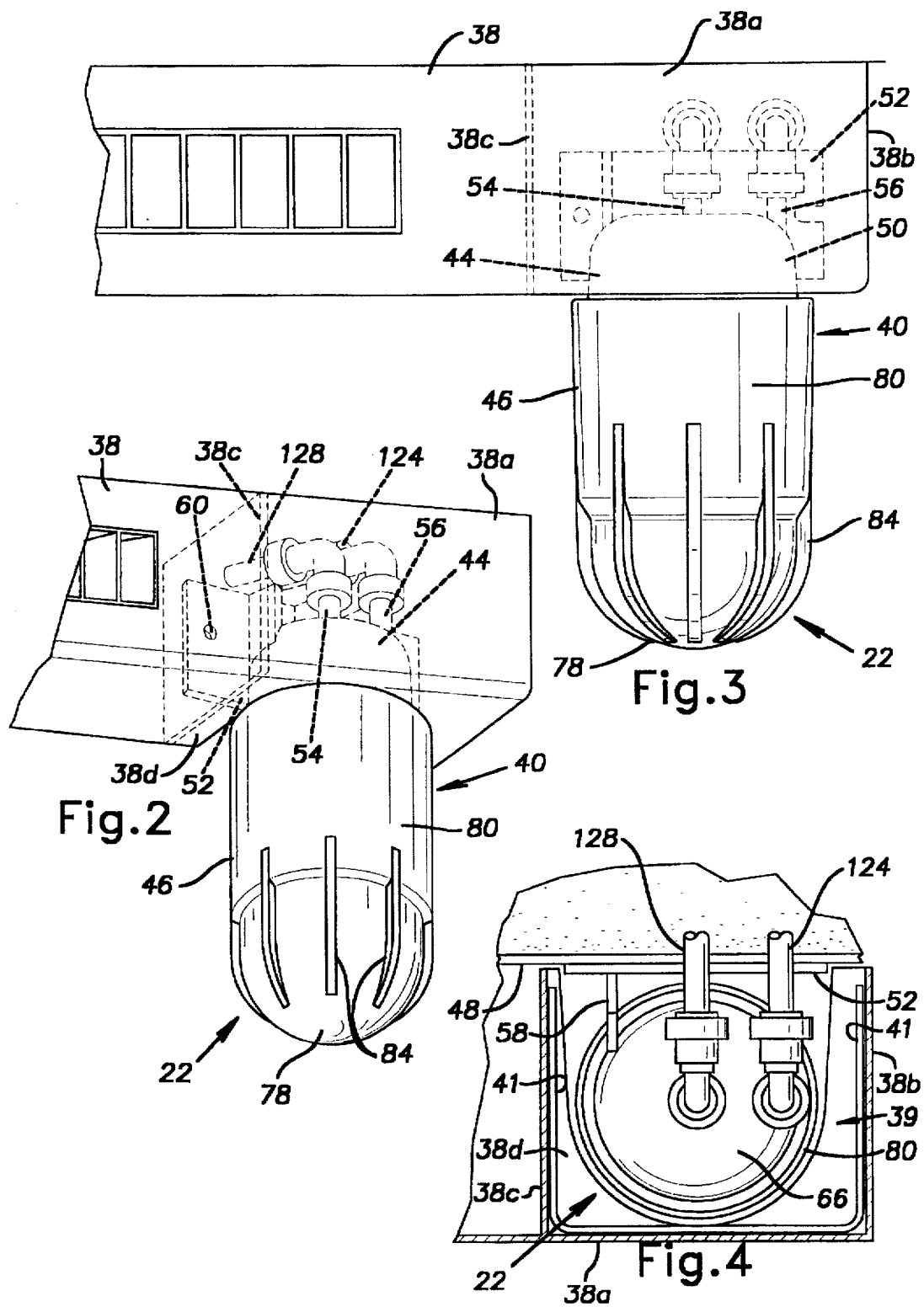

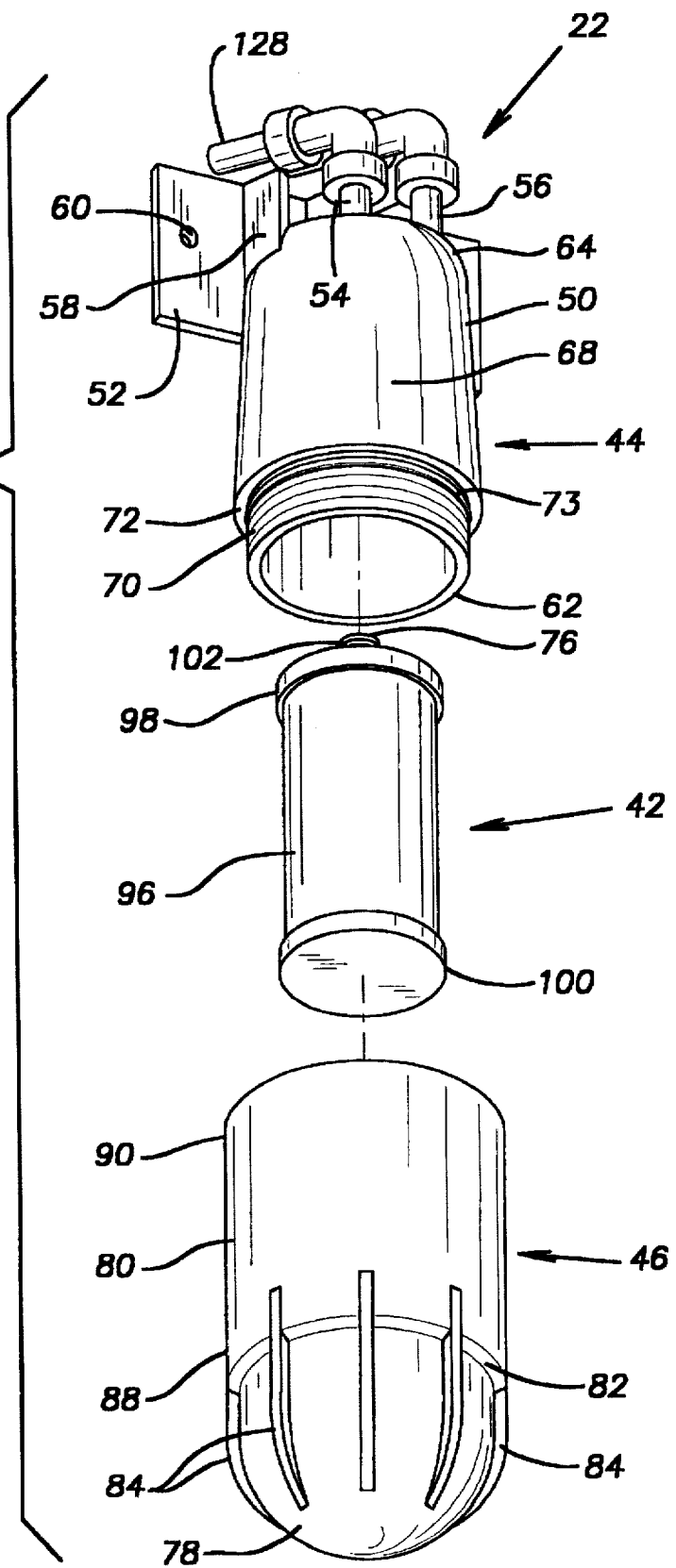

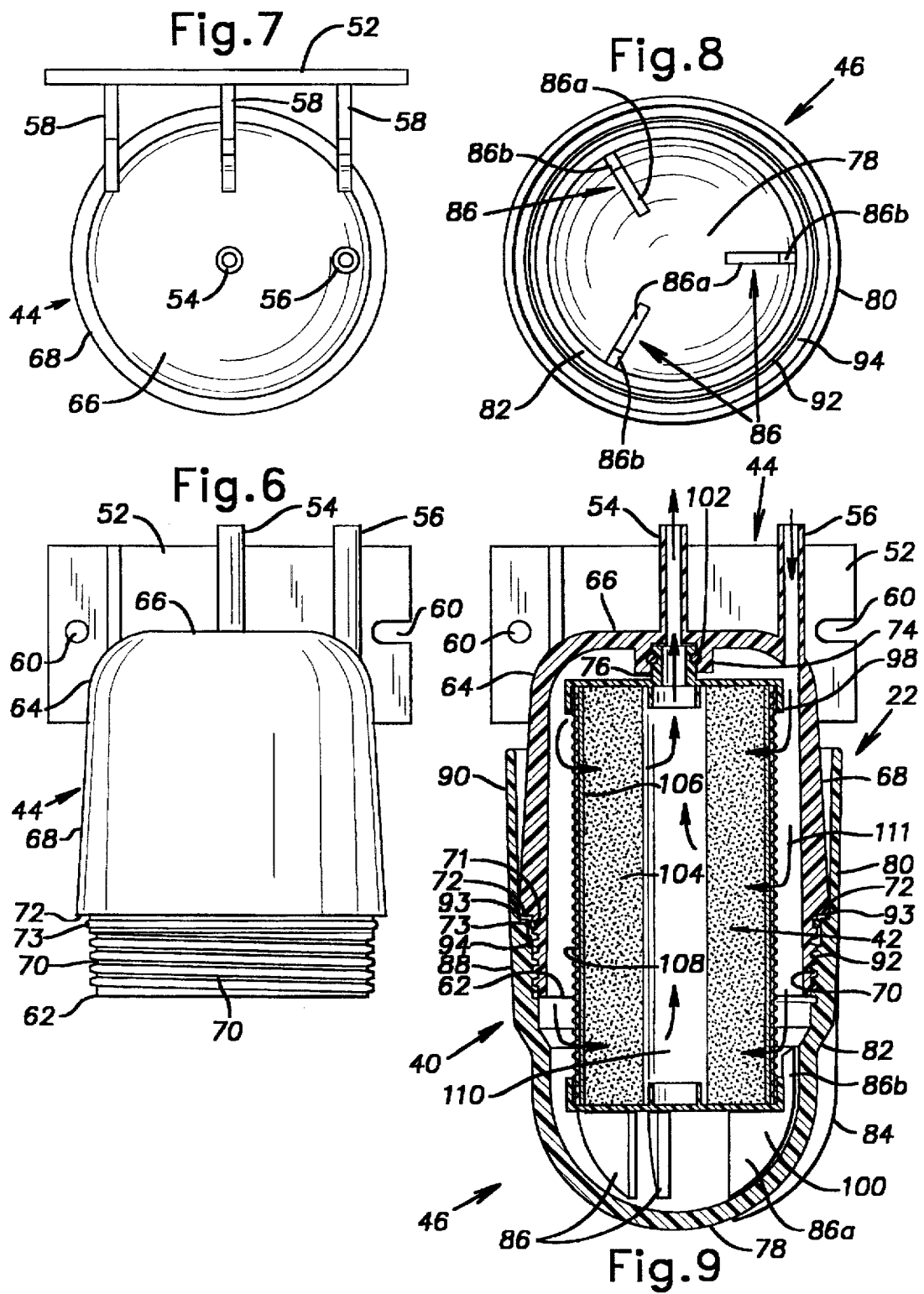

5,715,699

REFRIGERATOR WATER FILTER

This is a division of application Ser. No. 08/587,635, filed Jan. 17, 1996.

BACKGROUND OF THE INVENTION

1. Field of the Invention

The present invention relates to water filters and, more particularly, to refrigerator mounted water filters.

2. Description of Related Art

In recent years, as the public has begun to realize the benefits derived from drinking water and, preferably, highly pure water, there has been a great increase in the sale and availability of household water filtration devices. Concurrently, refrigerator mounted water dispensers and automatic ice makers have become more affordable, and more commonplace. In response to this fact, there have been attempts to incorporate water filters into household refrigerators to provide a filtered water supply for direct dispensing via the refrigerator water dispenser, or for use in making ice cubes via an automatic ice maker.

U.S. Pat. No. 5,135,645 discloses one attempt to incorporate a water filter into a refrigerator. The '645 patent teaches mounting the water filter within a compartment accessible via a door from the inside of the refrigerator compartment. The filter is formed as a replaceable cartridge having a cylindrical body from which inlet and outlet lines extend. A valve is operated by a manual switch, by removal of the filter cartridge, by opening the refrigerator door, or by opening the filter compartment door, to cut off the water supply to the filter. It is felt that the filtration system disclosed in the '645 patent is undesirable in that the filter cartridge must be mechanically disassembled from the water lines for replacement, which may be difficult for the user. It is also felt that concealing the filter cartridge may cause the user to forget to periodically replace the cartridge. It is also felt that the switches and shut off valves required by the '645 system introduce manufacturing costs to the resulting refrigerator which may render it cost-prohibitive, except on the most expensive refrigerator models.

U.S. Pat. No. 4,571,953 discloses a refrigerator having a water filtration unit. The water filtration unit includes a pair of chambers or filters which receive tap water and supply filtered water to a dispensing pipe extending from a top of the refrigerator. The '953 refrigerator is basically dedicated to providing a filtered cold water supply, and does not provide sufficient storage space required for a household refrigerator. See also, U.S. Pat. Nos. 4,859,320 and 4,808,302.

U.S. Pat. No. 5,083,442 discloses a refrigerator combined with a reverse-osmosis water purification system. The purification system is positioned external of the refrigerated compartment. U.S. Pat. No. 3,982,406 also provides an external filtration system for a refrigerator.

Despite the progress in the art exemplified by the foregoing patents, there exists a need in the art for a water filtration system for a household refrigerator which is accessible from within the refrigeration compartment, and which includes a filter cartridge that is easily replaceable.

SUMMARY OF THE INVENTION

The present invention provides an improved water filtration system for a household refrigerator. The system includes a water filter assembly which is accessible from within a refrigeration compartment of the refrigerator, and which includes an easily accessed and replaced filter cartridge.

In accordance with the present invention, a filter assembly includes a first housing part, a second housing part, and a replaceable filter cartridge. The first housing part and second housing part cooperate to define a chamber for receipt of the filter cartridge.

In further accordance with the present invention, the first housing part is secured to an internal surface of the refrigerator cabinet and includes an inlet port through which unfiltered water may enter the chamber and an outlet port through which filtered water may exit the chamber. The second housing part is releasably secured to the first housing part in a fluid tight manner.

In further accordance with the present invention, the second housing part has a bowl-shaped bottom portion from which a cylindrical sidewall extends upwardly. The cylindrical sidewall radially surrounds a portion of the first housing part. A threaded inner surface of the cylindrical sidewall is threaded onto the first housing part to releasably secure the first and second housing parts together in a fluid tight manner.

In further accordance with the present invention, a portion of the filter assembly is disposed within a filter compartment. A heater is provided within the filter compartment and is operable to heat the filter assembly and thereby prevent freezing of the water within the filter assembly.

In further accordance with the present invention, a water filtration and dispensing method includes providing first and second water control valves and a water filter assembly, wherein the first water control valve is upstream of the inlet to the water filter assembly and the second water control valve is downstream of an outlet of the water filter assembly. The water control valves are opened to permit dispensing of water, and can be sequentially closed such that the first water control valve closes slightly before the second water control valve to reduce the water pressure experienced by the filter assembly.

BRIEF DESCRIPTION OF THE DRAWINGS

These and further features of the present invention will be described hereafter with reference to the following description and drawings, wherein:

FIG. 1 is a perspective view of a household refrigerator incorporating a filter assembly according to the present invention;

FIG. 2 is a perspective view of a portion of the household refrigerator and the filter assembly of the present invention;

FIG. 3 is a front elevational view of the filter assembly and a portion of the refrigerator;

FIG. 4 is a top plan view of the filter assembly secured to the refrigerator;

FIG. 5 is an exploded perspective view of a filter assembly according to the present invention;

FIG. 6 is a front elevational view of an upper part of the filter housing according to the present invention;

FIG. 7 is a top plan view of the filter housing upper part shown in FIG. 6;

FIG. 8 is a top plan view of a lower part of the filter housing according to the present invention;

FIG. 9 is a cross-sectional view of the filter assembly according to the present invention;

DETAILED DESCRIPTION OF THE PREFERRED EMBODIMENT

Figure 10:
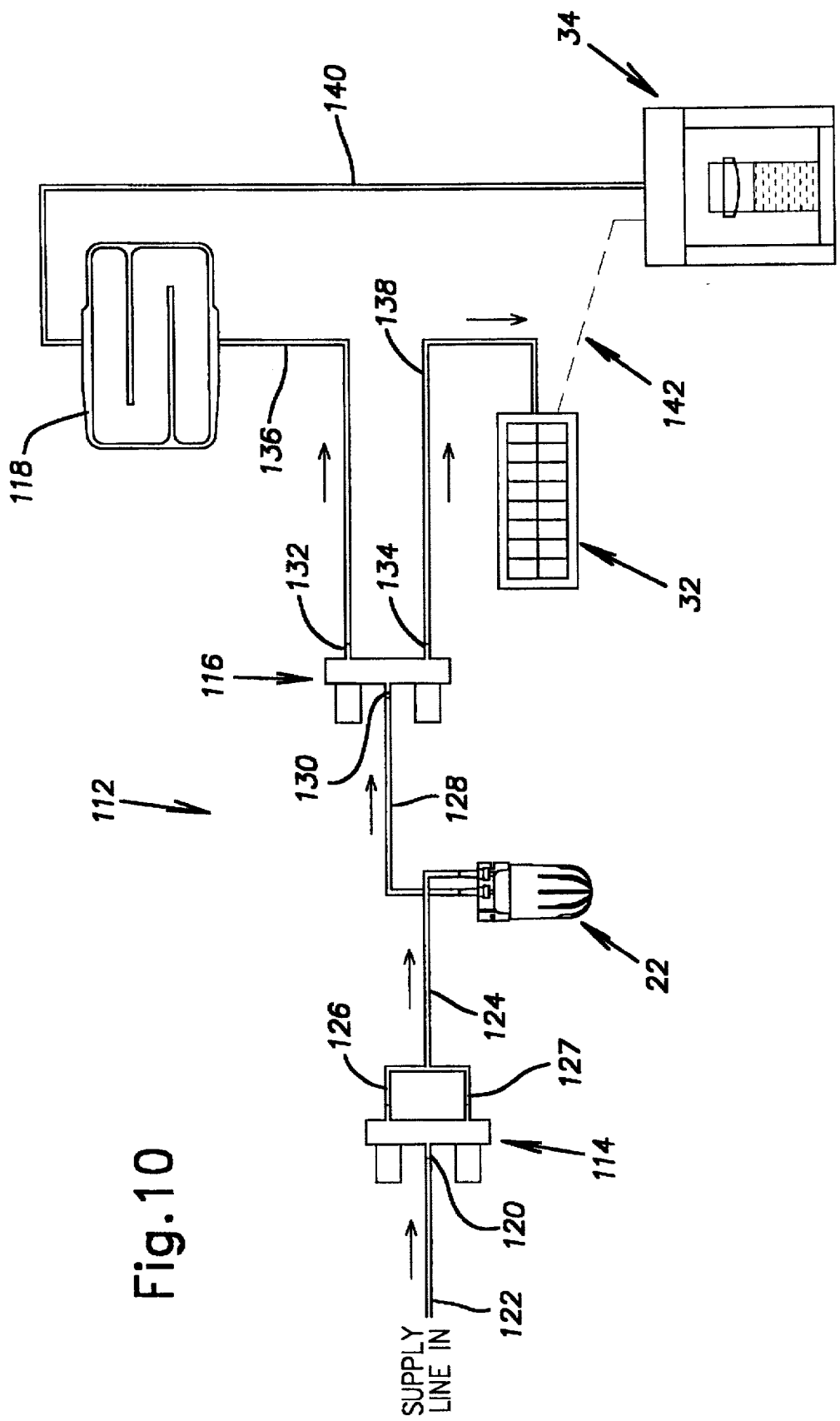
FIG. 10 is a schematic illustration of a water supply circuit for a household refrigerator incorporating the filter assembly of the present invention.

With reference to the drawing figures and, in particular, FIG. 1, a refrigerator 20 incorporating a filter assembly 22 according to the present invention is illustrated. The illustrated refrigerator includes a cabinet 24 having a plurality of insulated walls. A freezer door 26 and a refrigerator door 28 are pivotally mounted to the cabinet 24 and cooperate with the cabinet to define a freezer compartment (not shown) and a refrigeration compartment 30. The illustrated refrigerator 20 is commonly known in the art as a "side-by-side" refrigerator.

Naturally, it is contemplated that the filter assembly 22 of the present invention is useful in other types of refrigerators, such as ones wherein the freezer and refrigeration compartments are vertically offset relative to one another. Furthermore, although the following discussion is based upon incorporation of the filter assembly into a refrigerator which, as illustrated in FIG. 1 and schematically shown in FIG. 10, includes an automatic ice maker 32 and a freezer-door mounted ice and water dispenser 34, it is considered apparent that the filter assembly could be used in refrigerators that do not include an automatic ice maker, and in refrigerators wherein the ice and/or water dispenser is not accessible from an exterior of the refrigerator.

As shown in FIG. 1, the refrigeration compartment 30 is generally rectangular in configuration, and has a series of shelves 36 mounted therein for storage of foodstuffs. At an upper, rear portion of the refrigeration compartment a shield 38 is provided to which various controls (not shown) for regulating operating conditions of the refrigerator 20 may be mounted. The filter assembly 22 is partially concealed and surrounded by the shield 38, as illustrated in FIGS. 2-3.

The shield 38 includes a front wall 38a, a lateral side wall 38b, a partition wall 38c, and a bottom wall 38d which cooperate with a rear wall 48 of the cabinet 24 to define a filter compartment 39 which receives a portion of the filter assembly 22. The bottom wall 38d defines an opening through which the filter assembly 22 extends, as illustrated.

A thin film-type electrical resistance heater 41 is secured to inner surfaces of the front, lateral, and partition walls 38a, 38b, 38c, and serves to heat the shield 38, air within the filter compartment 39, the filter assembly 22, and water lines disposed within the filter compartment 39. Thus, the heater 41 prevents freezing of water within the filter assembly 22 and associated water lines, as will be apparent from the discussion to follow.

With reference to FIGS. 2-9, the filter assembly 22 includes a filter housing 40 and a replaceable filter cartridge 42. The filter housing 40 includes a first housing part 44 and a second housing part 46. The first housing part is preferably secured to the rear wall 48 of the cabinet 24 and, more preferably, is located in a rear and upper corner of the refrigeration compartment 30. The first housing part 44 is generally received within the filter compartment 39, and projects downwardly through the opening in the shield bottom wall 38d, as illustrated.

The first housing part 44 includes a main body 50 from which a mounting bracket 52, an outlet port connector 54, and an inlet port connector 56 integrally extend. The mounting bracket 52 is integrally connected to the main body 50 by a series of connecting webs 58, as illustrated. A pair of mounting apertures 60 are formed in the mounting bracket 52 to facilitate attachment of the bracket to the rear wall 48 of the cabinet 24 by mechanical fasteners, such as screws (not shown). Naturally, it is contemplated that various other means of mechanical attachment may be employed to secure the first housing part 44 to the refrigerator cabinet 24 without departing from the scope and spirit of the present invention. For example, snap-lock or bayonet-type connectors could be used in place of more conventional mechanical fasteners.

As shown best in FIGS. 5-7 and 9, the main body 50 of the first housing part 44 is generally cup-shaped, being open at its lower end 62, closed at its upper end 64 by an end wall 66, and having a generally cylindrical sidewall 68. The outlet port connector 54 projects from the end wall 66 and is generally co-axial with the sidewall 68 of the first housing part main body 50. The inlet port connector 56 also projects from the end wall 66, but is radially spaced from the common axis of the sidewall 68 and the outlet port connector 54, as illustrated.

The sidewall 68 of the first housing part main body 50 gradually increases in thickness as it extends downwardly away from the end wall 66. The outer periphery of the sidewall 68 is gradually sloped, while the inner diameter is generally constant, as illustrated.

At the lower end 62 of the main body 50, the sidewall 68 includes a reduced-thickness, externally threaded portion 70, a circumferential groove 71, and a downwardly-facing annular surface 72. The circumferential groove 71 receives an O-ring 73. The threaded portion 70 and the O-ring 73 cooperate with the second housing part 46 to permit fluid tight connection of the second housing part 46 to the first housing part 44, as will be described more fully hereafter.

The end wall 66 of the first housing part main body 50 has a mounting ring 74 projecting downwardly from an inner surface thereof. The mounting ring 74 is coaxial with the outlet port connector 54, and cooperates with an outlet connector 76 of the filter cartridge 42 to seal the filter cartridge outlet to the first housing part 44 and prevent unfiltered water from bypassing the filter cartridge 42, as will be apparent from the discussion to follow.

As shown best in FIGS. 5, 8 and 9, the second housing part 46 includes a bowl-shaped lower portion 78 and an upstanding, generally cylindrical sidewall 80 which are interconnected by a short frustoconical portion 82. A series of external ribs 84 are formed on the second housing part 46 to enhance gripping of the second housing part by the user, as will be necessary for the user to turn the second housing part 46 relative to the first housing part 44 during assembly and disassembly.

The bowl-shaped portion 78 of the second housing part also has a series of ribs 86 formed on an internal surface thereof to aid in locating and supporting the filter cartridge 42 during assembly. The ribs 86 include a first part 86a and a second part 86b. The first parts 86a of the ribs 86 define a horizontal support surface for the filter cartridge 42. The second parts 86b extend upwardly from the first parts 86a, and define vertical surfaces which radially surround and support the filter cartridge 42.

The sidewall 80 of the second housing part 46 includes a lower or first portion 88 and an upper or second portion 90, as shown best in FIG. 9. The first portion 88 is relatively thicker than the second portion 90, and includes a threaded inner surface 92, an upwardly facing annular surface 93, and an annular sealing surface 94. The threaded inner surface 92 is threadably received by the externally threaded portion 70 of the first housing part 44. The upwardly facing annular surface 93 of the second housing part 46 is adjacent the downwardly facing annular surface 72 of the first housing part. The annular sealing surface 94 engages the O-ring 73 to provide a fluid-tight seal between the housing parts 44, 46.

As shown in FIGS. 5 and 9, the filter cartridge 42 includes a cylindrical filter body 96 and upper and lower end caps 98, 100. The upper and lower end caps 98, 100 cover the ring-shaped ends of the filter body 96, and extend along the cylindrical sides of the filter body 96 a short distance, as illustrated in FIG. 9.

The upper end cap 98 has the outlet connector 76 projecting upwardly therefrom. The outlet connector 76 is generally coaxial with the filter body 96 and extends into the downwardly extending mounting ring 74 provided by the first housing part end wall 66. Preferably, the outlet connector 76 has a circumferential groove which receives an O-ring 102 to sealingly attach the upper end cap 98 of the filter cartridge 42 to the first housing part 44, and thereby prevents unfiltered water from bypassing the filter cartridge, as mentioned previously.

The lower end cap 100 is engaged and supported by the ribs 86 extending from the inner surface of the bowl-shaped portion 78 of the second housing part 46. The first parts 86a of the ribs 86 engage the circular bottom surface of the lower end cap 100 and vertically support the filter cartridge 42. The second parts 86b of the ribs radially surround the lower end cap 100, and radially align or orient the filter cartridge 42.

During assembly, as will be described hereafter, the ribs 86 engage the lower end cap 100 to support the filter cartridge 42 while the second housing part 46 is being threaded onto the first housing part 44. The ribs 86 serve to properly position and align the filter cartridge 42 such that the outlet connector 76 is inserted into the mounting ring 74.

The cylindrical filter body 96 preferably has a multi-material construction, including an inner cylinder of compressed or extruded carbon 104, an intermediate layer of fiber floss 106, and an outer mesh wrap 108. A longitudinal bore 110 extends the length of the filter body 96 and is in fluid communication with the outlet connector 76 and the outlet port connector 54.

Water is introduced through the inlet port connector 56 into a chamber 111 defined by the first and second housing parts and in which the filter cartridge 42 is disposed. The unfiltered water is filtered as it flows radially inwardly through the filter body 96 and toward the longitudinal bore 110. The filtered water thereafter flows upwardly through the bore 110, through the outlet connector 76 and out the outlet port connector 54. Naturally, it is contemplated that other types or styles of filter cartridges may be interchanged with the preferred and illustrated filter cartridge 42 without departing from the scope and spirit of the present invention.

During assembly, and with the first housing part 44 secured to the rear wall 48 of the cabinet 24, the filter cartridge 42 is inserted into the first housing part 44 such that the outlet connector 76 extends into the mounting ring 74 provided by the first housing part end wall 66 and the O-ring 102 sealing engages an inner surface of the mounting ring 74 in a fluid-tight manner. Thereafter, the second housing part 46 is threaded onto the first housing part 44.

As the second housing part 46 is completely threaded onto the first housing part 44, the inner ribs 86 of the second housing part engage the filter cartridge lower end cap 100 to longitudinally and radially support the filter cartridge 42, and force the filter cartridge outlet connector 76 further into the mounting ring 74. Also, the second housing part's annular sealing surface 94 is brought into sealing engagement with the O-ring 73 provided by the first housing part 44, as described briefly hereinbefore.

Alternatively, the filter cartridge 42 may first be inserted into the second housing part 46 such that the lower end cap 100 is radially and longitudinally supported by the second housing part's inner ribs 86. The second parts 86b of the ribs 86 serve to vertically and radially align the filter cartridge 42 such that, upon subsequent threaded attachment of the first and second housing parts 44, 46, the outlet connector 76 of the filter cartridge is coaxial aligned with, and inserted into, the mounting ring 74 of the first housing part, and the O-ring 102 on the outlet connector 76 sealing engages the inner surface of the mounting ring 74 in a fluid-tight manner.

The water filter assembly 22 described above is intended for use as part of a water filtering and dispensing system 112, schematically illustrated in FIG. 10. The filtering and dispensing system 112 includes, in addition to the above-described water filter assembly 22, first and second control valves 114, 116, a filtered water storage tank 118, the automatic ice maker 32, and the combination ice/water dispenser 34.

The first control valve 114 is relatively upstream, in a direction of water flow, from the water filter assembly 22, and controls the delivery of unfiltered water to the water filter assembly 22. The first control valve 114 has an input 120 and first and second outputs 126, 127 which are opened and closed by solenoids 126a, 127a, respectively (FIG. 11).

The first control valve input 120 is connected to a source of household tap water by a household water supply line 122. The first and second outputs 126, 127 are connected to the inlet port connector 56 via an unfiltered water supply line 124. The unfiltered water supply line 124 lies within the insulated cabinet rear wall 48, and extends or projects into the filter compartment 39 a short distance, as shown in FIGS. 2–4.

A filtered water supply line 128 extends from the outlet port connector 54 of the first housing part 44 to an input 130 of the second control valve 116. Like the unfiltered water supply line 124, the filtered water supply line 128 lies within the insulated cabinet rear wall 48, and extends or projects into the filter compartment 39 a short distance (FIGS. 2–4).

Figure 11:
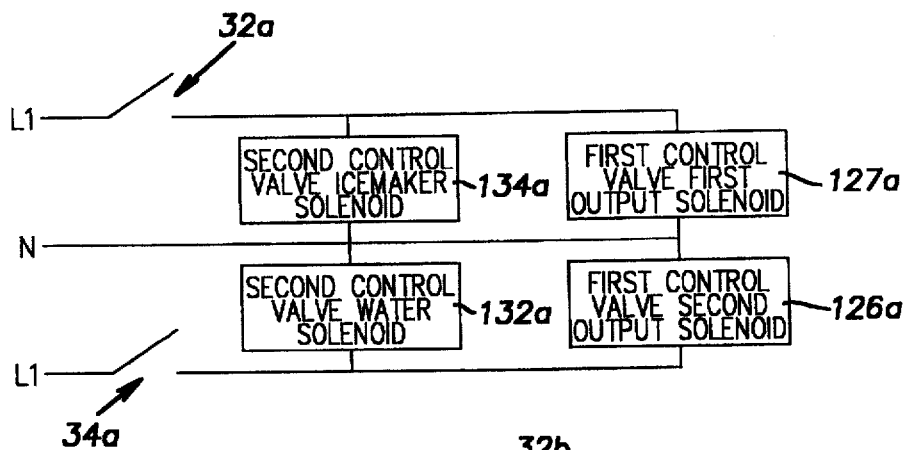
FIG. 11 is a schematic illustration of a control circuit for the water supply circuit illustrated in FIG. 10.

The second control valve 116 has first and second outputs 132, 134 which are opened and closed by solenoids 132a, 134a, respectively (FIG. 11). The first output 132 is fluidly connected to the water storage tank 118 via a first conduit 136, and the second output 134 is connected to the ice maker 32 via a second conduit 138. Preferably, the second output 134 of the second control valve 116 includes a "flow washer" to regulate the flow of water into the ice maker 32 to provide a controlled filling thereof, as is known in the art.

An output of the water storage tank 118 is also connected to the ice/water dispenser 34 by a third conduit 140. The ice maker 32 delivers ice to the ice/water dispenser 34 via a chute 142, as is well known in the art. The ice/water dispenser 34 includes a water dispenser switch 34a. The ice maker 32 includes a switch 32a.

With reference to FIG. 11, when the ice/water dispenser 34 is actuated to dispense water, the water dispenser switch 34a is closed which, in turn, provides power to the first control valve's first solenoid 126a and to the second control valve's first solenoid 132a to open the control valves' first outputs 126, 132, respectively. Opening the first outputs 126, 132 permits the flow of unfiltered water into the filter assembly 22 and the flow of filtered water into the cold water storage tank 118 and out of the ice/water dispenser 34.

Similarly, when the automatic ice maker 32 needs water to make more ice, the ice maker switch 32a is closed which, in turn, provides power to the first control valve's second solenoid 127a and to the second control valve's second solenoid 134a to open the control valves' second outputs 127, 134 respectively. Opening the second Outputs 126b, 132b permits the flow of unfiltered water into the filter assembly 22 and the flow of filtered water to the ice maker 32.

Figure 12:
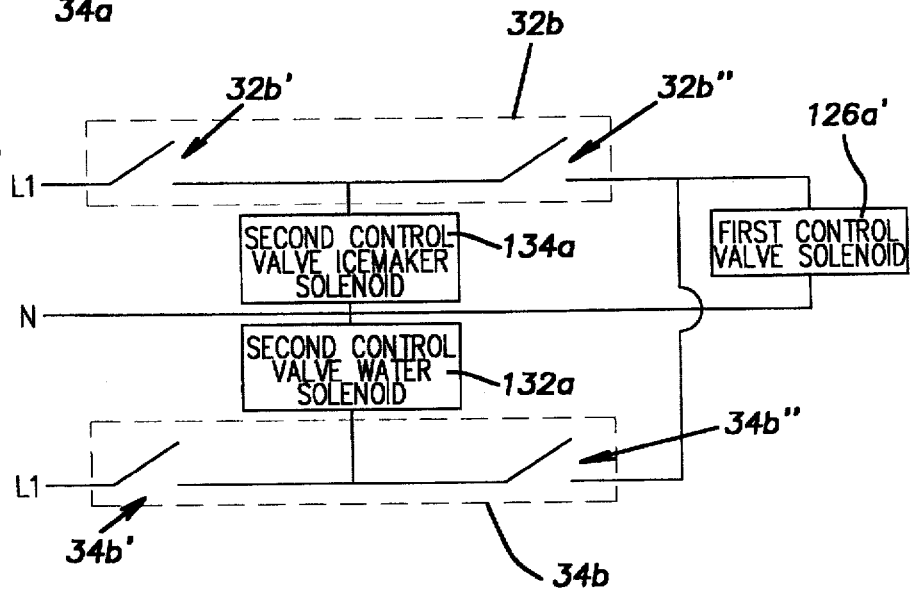
FIG. 12 is a schematic illustration of a first alternative control circuit according to the present invention; and, FIG. 13 is a schematic illustration of a second alternative control circuit according to the present invention.

A first alternative control circuit is shown in FIG. 12, and is adapted for use with an alternative first control valve (not shown) The alternative first control valve differs from the previously-described first control valve 114 in that it has only a single output controlled by a solenoid 126a'. The first alternative control circuit includes, in addition to the second control valve 116 described hereinbefore and the alternative first control valve, a double-throw ice maker switch 32b having first and second contacts 32b', 32b", and a double-throw water dispenser switch 34b having first and second contacts 34b', 34b".

Closing the water dispenser switch 34b closes the first and second contacts 34b', 34b", and provides power to the alternative first control valve solenoid 126a' and to the second control valve's first solenoid 132a to thereby open the alternative first control valve output and the first output 132 of the second control valve 116 and permit the flow of unfiltered water into the filter assembly 22 and the flow of filtered water into the cold water storage tank 118 and out of the ice/water dispenser 34.

Similarly, closing the ice maker switch 32b closes the first and second contacts 32b', 32b", and provides power to the alternative first control valve solenoid 126a' and to the second control valve's second solenoid 134a to open the alternative first control valve output and the second output 134 of the second control valve 116 and thereby permit the flow of unfiltered water into the filter assembly 22 and the flow of filtered water to the ice maker 32.

Figure 13:
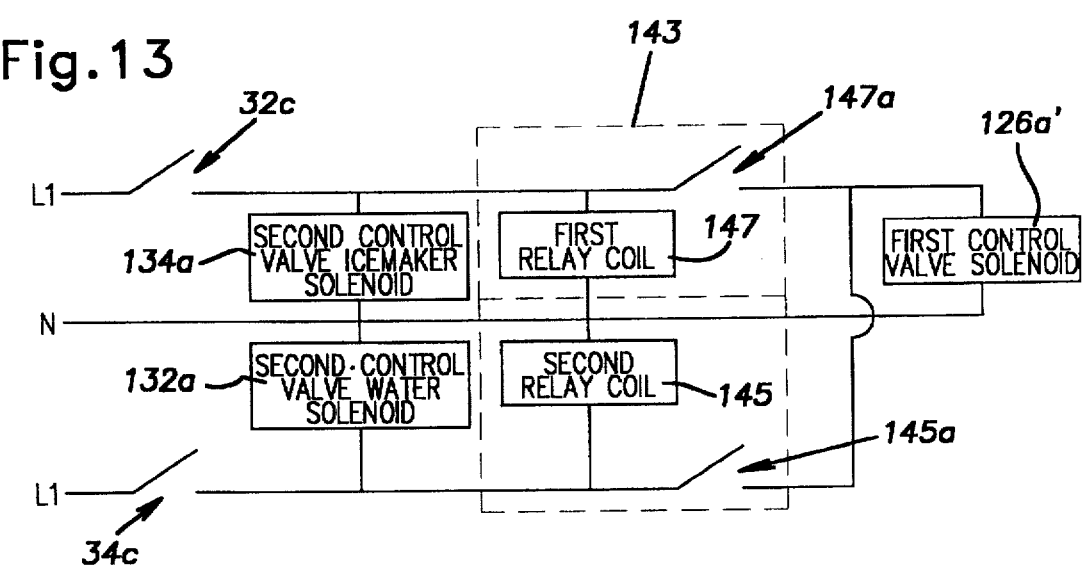

A second alternative control circuit is shown in FIG. 13. The circuit includes, in addition to the second control valve 116 and the alternative first control valve described hereinbefore, a single-throw ice maker switch 32c, a single-throw water dispenser switch 34c, and a relay 143. The relay 143 has a first relay coil 145 controlling a first relay contact 145a and a second relay coil 147 controlling a second relay contact 147a.

When the water dispenser switch 34c is closed, the first solenoid 132a of the second control valve 132 is energized to open the second control valve's first output 132. The first relay coil 145 is energized to close the first contact 145a and supply power to the alternative first control valve solenoid 126a' and thereby open the alternative first control valve. Thus, unfiltered water flows into the filter assembly 22 and filtered water flows into the cold water storage tank 118 and out of the ice/water dispenser 34.

Similarly, when the ice maker switch 32c is closed, the second solenoid 134a of the second control valve 116 is energized to open the second control valve's second output 134. The second relay coil 147 is energized to close the second contact 147a and supply power to the alternative first control valve solenoid 126a' and thereby open the alternative first control valve. Thus, unfiltered water flows into the filter assembly 22 and filtered water flows into the ice maker 32.

In each case (i.e., whether the water dispenser 34 or ice maker 32 is supplied with water), the first control valve 114 is preferably closed prior to the closing of the second control valve 116. More preferably, the first control valve 114 is closed about one second before the second control valve 116 is closed. Delaying the closure of the second control valve 116 relative to the first control valve 114 reduces the water pressure on the water filter assembly 22, and thereby reduces the chance for failure of the filter assembly, the necessary strength of the seals and parts of the filter assembly, and the resulting cost of the filter assembly. The delayed closure of the second control valve 116 also makes disassembly of the filter housing 40 by removal of the second housing part 46 from the first housing part 44 easier by reducing the water-pressure induced tension on the filter assembly 22.

As should be apparent from the foregoing, access to the filter cartridge 42 for replacement is gained by simply twisting or turning the second housing part 46 to unthread the second housing part 46 off the first housing part 44. During such replacement, the second housing part's bowl-shaped lower portion 78 and sidewall 80 cooperate to define a receptacle which has an available volume sufficient to receive and contain the filter cartridge 42, the water within the filter assembly chamber 111, as well as any water within the unfiltered water supply line 124 and the filtered water supply line 128. Thus, leakage or spillage of water into the refrigeration compartment 30 during filter cartridge replacement is eliminated or minimized. Once the spent filter cartridge 42 is removed, a new filter cartridge is installed in the manner described hereinbefore.

Several alternative means may be employed to notify the user that the filter cartridge 42 needs replacement. The simplest, and least expensive, is simply the reduction in the flow rate of water during dispensing, which occurs when the filter cartridge becomes clogged. Other more sophisticated devices, such as clock reminders or flow rate and pressure drop across filter monitors, with associated indicators, may also be used.

It is noted that the filter assembly 22 can be used without a filter cartridge 46 when a filtered water supply is not desired. This would be the case, for instance, when the household has a filter for all tap water, such as a household reverse-osmosis filter.

Due to the location of the water filter assembly 22 at a top rear portion of the refrigeration compartment 30, which tends to be the warmest portion of the refrigeration compartment, the water pressure at the filter assembly 22, and the short lengths of the unfiltered water supply line 124 and filtered water supply line 128 exposed within the filter compartment 39, the water within the filter assembly chamber 111 and water lines 124, 128 does not tend to freeze. However, in the illustrated and preferred embodiment, the heater 41 is provided to more completely eliminate the risk of water freezing within the filter assembly 22 and water lines 124, 128 disposed within the refrigeration compartment 30.

As noted briefly hereinbefore, the illustrated and preferred heater 41 is a thin film or strip-type electrical resistance heater and is attached to the inner surfaces of the shield's front, lateral, and partition walls 38a, 38b, 38c. The heater 41 is preferably wired to the refrigerator compressor (not shown) so that the heater is activated when the refrigerator compressor is operating to supply cold air to the refrigeration compartment 30. Therefore, the heater 41 warms the shield 38 and air within the filter compartment 39 at the same time cold air is being introduced into the refrigeration compartment 30, and thereby warms the water within the filter assembly 22, the unfiltered water supply line 124, and the unfiltered water supply line 128.

The heater 41 may, alternatively, be activated automatically on an as-needed basis, via a thermostat or other controls which sense air or water temperature, may be activated periodically, or may be activated concurrent with other cycles of the refrigerator 20, such as the defrost cycle.

While the preferred embodiment of the present invention is shown and described herein, it is apparent that numerous modifications, rearrangements, alterations, and substitutions of parts may be resorted to without departing from the scope and spirit of the present invention as defined in the claims appended hereto. For example, it is contemplated that the flow path of water within the filter assembly 22 may be altered such that unfiltered water is introduced into the longitudinal bore 110 within the filter body 96 and flows radially outwardly into the chamber 111 to an axially-displaced outlet. Alternatively, unfiltered water may be introduced into the filter chamber 111 outside a filter cartridge and flow vertically upwardly through the cartridge bottom to an axially-aligned output.

It is also contemplated, though not preferred due to spacial constraints within the refrigeration compartment 30, that the second or lower housing part could be fixedly attached to the cabinet 24 and the first or upper housing part removably secured to the second housing part to more completely eliminate the chance for spillage of water during filter cartridge replacement.

It is also contemplated that the filter cartridge 42 could be threadably secured to the first or second housing parts 44, 46 to provide a more positive alignment and sealing thereof, or that the filter cartridge could be integrally formed with the removable second (or first) housing part. Therefore, the scope of the present invention is not limited solely to the preferred embodiment shown and described herein, but rather includes numerous other devices that fall within the meaning of the following claims.

What is claimed is:

1. A water filtration and dispensing system for a refrigerator, said refrigerator comprising an insulated cabinet having a refrigerator door pivotally mounted thereto, said refrigerator door cooperating with said cabinet to define a refrigeration compartment, said filtration and dispensing system comprising:

a first control valve for unfiltered water and a second control valve for filtered water, said first control valve having an input and an output, said second control valve having an input and first and second outputs;

a household water supply line extending from a source of household water to said first control valve input;

a water filter assembly secured to said cabinet and disposed within said refrigeration compartment, said water filter assembly being readily accessible and visible to a user when said refrigerator door is open, said filter assembly includes a filter housing and a replaceable filter cartridge, said filter housing including a first housing part and a second housing part which cooperate to define a chamber for receipt of said filter cartridge, said water filter assembly first housing part having an inlet and an outlet;

an unfiltered water supply line connected, at one end, to said first control valve output and, at another end, to said water filter assembly inlet;

a filtered water supply line connected, at one end, to said water filter assembly outlet and, at another end, to said second control valve input;

a filtered cold water dispenser fluidly connected to said first output of said second control valve; and, an ice maker disposed within a freezer compartment of said refrigerator and fluidly connected to said second output of said second control valve.

2. A water filtration and dispensing system according to claim 1, wherein said first and second housing parts are releasably secured to one another in a fluid tight manner, said first housing part being fixedly secured to said refrigerator cabinet.

3. A water filtration and dispensing system according to claim 2, wherein said second housing part has a bowl-shaped bottom portion from which a generally cylindrical wall upwardly extends, a bottom of said cylindrical wall including a threaded inner surface which threadably engages a threaded outer surface of said first housing part to secure said first and second housing parts together, said second housing part being unthreaded from said first housing part to gain access to said filter cartridge.

4. A water filtration and dispensing system for a refrigerator, said refrigerator comprising an insulated cabinet having a refrigerator door, said refrigerator door cooperating with said cabinet to define a refrigeration compartment, said filtration and dispensing system comprising:

a first control valve for unfiltered water and a second control valve for filtered water, said second control valve having an input and first and second outputs;

a household water supply line extending from a source of household water to said first control valve input;

a water filter assembly secured to said cabinet and disposed within said refrigeration compartment, said water filter assembly being readily accessible and visible to a user when said refrigerator door is open, said filter assembly includes a filter housing and a replaceable filter cartridge, said filter housing including a first housing part and a second housing part which cooperate to define a chamber for receipt of said filter cartridge, said water filter assembly first housing part having an inlet and an outlet;

an unfiltered water supply line connected, at one end, to said first control valve and, at another end, to said water filter assembly inlet;

a filtered water supply line connected, at one end, to said water filter assembly outlet and, at another end, to said second control valve input;

a filtered cold water dispenser fluidly connected to said first output of said second control valve;

an ice maker disposed within said freezer compartment and fluidly connected to said second output of said second control valve; and, means for controlling opening and closing of said first and second control valves.

5. A water filtration and dispensing system according to claim 4, wherein said control means includes a water dispenser switch and an ice maker switch which control opening and closing of the first and second control valves.

6. A water filtration and dispensing system according to claim 5, wherein said first control valve comprises first and second outputs, and wherein the first and second control valves each comprise first and second solenoids which respectively control opening of the control valves' first and second outputs.

7. A water filtration and dispensing system according to claim 6, wherein closing of the water dispenser switch energizes the first and second control valves' first solenoids to open the first outputs of the first and second control valves and thereby permit the flow of unfiltered water into the water filter assembly and the flow of filtered water out of the water dispenser.

8. A water filtration and dispensing system according to claim 6, wherein closing of the ice maker switch energizes the first and second control valves' second solenoids to open the second outputs of the first and second control valves and thereby permit the flow of unfiltered water into the water filter assembly and the flow of filtered water to the ice maker.

9. A water filtration and dispensing system according to claim 5, wherein the first control valve has an output which is opened and closed by a solenoid and the second control valve has first and second solenoids which control opening of the second control valve's first and second outputs.

10. A water filtration and dispensing system according to claim 9, wherein the ice maker and water dispenser switches are double-throw switches, and wherein closing the water dispenser switch energizes the first control valve solenoid and the first solenoid of the second control valve to open the first control valve output and the first output of the second control valve and thereby permit the flow of unfiltered water into the filter assembly and the flow of filtered water to the water dispenser, and wherein closing the ice maker switch energizes the first control valve solenoid and the second solenoid of the second control valve to open the first control valve output and the second output of the second control valve and thereby permit the flow of unfiltered water into the filter assembly and the flow of filtered water to the ice maker.

11. A water filtration and dispensing system according to claim 9, further comprising a relay having a first coil electrically connected in parallel with the first solenoid of the second control valve and a second coil electrically connected in parallel with the second solenoid of the second control valve, and wherein the first coil is operable to energize the first control valve solenoid upon closing of the water dispenser switch and the second coil is operable to energize the first control valve solenoid upon closing of the ice maker switch.

12. A water filtration and dispensing system according to claim 4, wherein said first and second housing parts are releasably secured to one another in a fluid tight manner, said first housing part being fixedly secured to said refrigerator cabinet.

13. A water filtration and dispensing system according to claim 12, wherein said second housing part has a bowl-shaped bottom portion from which a generally cylindrical wall upwardly extends, a bottom of said cylindrical wall including a threaded inner surface which threadably engages a threaded outer surface of said first housing part to secure said first and second housing parts together, said second housing part being unthreaded from said first housing part to gain access to said filter cartridge.

14. A water filtration and dispensing system according to claim 13, further comprising a heater disposed within said refrigeration compartment, said heater being operable to prevent freezing of water within said unfiltered water supply line, said filtered water supply line, and said water filter assembly.

15. A water filtration and dispensing system according to claim 1, further comprising a heater disposed within said refrigeration compartment, said heater being operable to prevent freezing of water within said unfiltered water supply line, said filtered water supply line, and said water filter assembly.

* * * * *